United States Patent [19]

Avdzhiev et al.

[11] 4,217,146

[45] Aug. 12, 1980

[54] PLUGGING FLUID

[76] Inventors: Georgy R. Avdzhiev, ulitsa Oplesnina, 30, kv. 25; Leonid M. Ruzin, Yarega, ulitsa Kosmonavtov, 5, kv. 26, both of Komi ASSR, Ukhta, U.S.S.R.

[21] Appl. No.: 931,425

[22] Filed: Aug. 7, 1978

[51] Int. Cl.$^2$ .......................... C04B 43/00; C09K 7/06
[52] U.S. Cl. .................................. 106/285; 166/302; 252/8.55 R; 252/62
[58] Field of Search .................. 166/302; 106/285; 252/8.55 R

[56] References Cited

U.S. PATENT DOCUMENTS

| | | | |
|---|---|---|---|
| 3,719,601 | 3/1973 | Jacocks | 252/62 |
| 3,899,026 | 8/1975 | Culter | 166/302 |

OTHER PUBLICATIONS

Rogers, *Comp. and Props. of Oil Well Drilling Fluids,* 1 ed., (Gulf, 1948), pp. 391–393.
Rogers, *Comp. and Props. of Oil Well Fluids,* 3 ed., (Gulf 1963), pp. 184–185, 194–195.
Martens, *Tech. of Paints, Varnishes and Lacquers,* (Reinhold 1968), pp. 343, 358.

*Primary Examiner*—Carman J. Seccuro
*Attorney, Agent, or Firm*—Steinberg & Blake

[57] ABSTRACT

A plugging fluid on the basis of a hydrocarbon liquid and a weighting material, wherein said weighting material is titanium dioxide, the afore-listed components being taken in the following amounts in percent by weight:
  hydrocarbon liquid: 60 to 80
  titanium dioxide: 20 to 40.

6 Claims, No Drawings

PLUGGING FLUID

The present invention relates to the recovery of oil by mining with the utilization of heat and, more particularly, it relates to plugging fluids for sealing the annular space in holes.

The present invention can be utilized most advantageously when recovering oil by mining from an oil bed with the aid of upward intake and development wells drilled from excavations located in the oil bed or below the oil bed.

The present invention can also be used in other spheres of industry involving the use of liquid sealing materials stable to heat effect and featuring heat-insulating properties.

The use of liquid solidifying materials for sealing the annular space in holes with high temperature appears difficult due to the emergence of high temperature stresses resulting in their deterioration and loss of sealing.

Moreover, the use of solidifying materials for sealing purposes is limited by difficulties caused by unsealing of the annular space of holes for technological purposes.

There is known in the prior art a plugging fluid for sealing the space between casing and lifting strings in holes, consisting of hydrocarbons thickened with magnesium silicate. The concentration of magnesium silicate in the hydrocarbon liquid is 1 to 10 percent by weight. The density of such a plugging fluid does not exceed 1,017 kg/m$^3$ (cf., U.S. Pat. No. 3,719,601, class 252-62, published in 1973).

Said prior art fluid is disadvantageous in that its density is lower than the density of stratal water. As a result, the use of said fluid for sealing the annular space of upward holes is restricted for, in this case, stratal water moves to the wellhead and forces the sealing plugging fluid from the wellhead to the bottom.

Also known in the prior art is a plugging fluid for sealing the annular space in holes, which is a suspension on the basis of a hydrocarbon liquid containing a mineral weighting material. Used as the weighting material in said suspension is superfinely crushed silica with a particle size of below 0.1$\mu$ having a low heat conductivity in oil. The density of this latter plugging fluid is 988 kg/m$^3$ (cf., U.S. Pat. No. 3,899,026, class 166-302, published in 1975).

Said prior art fluid suffers from inadequate density and, therefore, fails to ensure the sealing of the annular space of an upward hole because it is forced from the wellhead to the bottom by condensed vapor when the hole is used as an intake one for the vapor injection into the oil bed, or by stratal water when the hole is used as a development one for oil recovery, inasmuch as condensed vapor and stratal water have a density higher than 988 kg/m$^3$.

Said latter plugging fluid further fails to ensure the sealing of the annular space of an upward hole during the recovery of oil because the flow of oil moves to the wellhead from the annular space between the casing and lifting strings directly to the lifting pipes and washes out the low-density plugging fluid in the annular space near the wellhead of the upward hole.

Further, said prior art plugging fluid suffers from inadequate stability because of the lack of affinity between silica and oil, which affects the reliability of sealing holes.

It is the object of the present invention to provide the sealing properties of the fluid in upward intake and development wells when injecting therethrough a coolant into the oil bed and during the recovery of oil.

In the accomplishment of said and other objects of the invention, in a plugging solution containing a hydrocarbon liquid and a weighting material, according to the invention, the weighting material is titanium dioxide, the afore-listed components being taken in the following amounts in percent by weight:

hydrocarbon liquid: 60 to 80
titanium dioxide: 20 to 40.

The plugging fluid is based on said hydrocarbon liquid containing no light fractions likely to boil off at the temperature of coolant injected into the oil bed.

As a rule, such liquid is either high viscous crude oil or any other oil after the distillation of light fractions.

The low heat conductivity of the hydrocarbon liquid imparts heat-insulating properties to the plugging solution.

It is common knowledge that the heat conductivity of oil is almost seven times less than that of cements usually used for sealing the annular space of holes.

An increased concentration of hydrocarbon liquid in the disclosed plugging fluid results in a lower heat conductivity and improved heat-insulating properties of the latter.

The other component of the plugging solution, i.e., titanium dioxide used as the weighting material, is a mineral filler possessing a number of valuable properties, namely:
(1) it is fully inert with respect to hydrocarbon liquid over a very wide temperature range;
(2) it is characterized by a complete absence of hydrolysis upon contact with solvent such as vapor, water or aqueous solutions of any reactants;
(3) it has a high density ensuring the possibility of preparing a plugging fluid with a density of over 1,200 kg/m$^3$ while retaining fluidity; the density of the rutile modification of the titanium dioxide is 4260 kg/m$^3$, while the anatase one is 3840 kg/m$^3$;
(4) the surface of its particles is hydrophobic, which provides for a good affinity of titanium dioxide with oil and, consequently, an increased stability of the suspension.

The only requirement of the titanium dioxide in preparing a plugging fluid is that its particle size should not exceed 0.5$\mu$. It is further desired that its particle size should not exceed 0.1$\mu$. Its quality, whiteness, covering power and method of preparation (sulfuric acid or chlorine) have practically no effect on the sealing properties of the fluid. This makes it possible to use in the preparation of plugging fluids a low-quality and even nonstandard titanium dioxide, as well as appropriately comminuted natural material.

An increase of the titanium dioxide concentration in the plugging fluid within 20–40 percent results in a rather insignificat increase of its heat conductivity while considerably increasing its density and improving its sealing properties.

The combination of specific features of the herein disclosed chemical and phase composition of plugging fluid provides for:
(a) the temperature of the onset of boiling of the solution equal to 200°–220° C.;
(b) long-lasting stability and non-delamination of the fluid at a temperature below that of the onset of boiling;

(c) heat conductivity of 0.282 W/m.K at an average concentration of titanium dioxide in oil of 30 percent by weight;

(d) high density and viscosity of the fluid, as presented in the following table:

| Titanium dioxide content, wt. % | Density, kg/m$^3$ | Viscosity, m$^2$/s |
|---|---|---|
| 20 | 1.075 | 56.4 . 10$^6$ |
| 40 | 1.341 | 70.0 . 10$^6$ |

(e) non-toxicity.

The above-mentioned features of the disclosed plugging fluid help preclude the evaporation of the fluid upon heating with coolant when sealing the annular space of upward holes drilled from excavations in the oil bed, as well as ensure its stability over a long period of time while retaining throughout this period high sealing and heat-insulating properties.

This makes for reliable sealing of the annular space of upward intake wells when injecting coolant thereinto, as well as for precluding the penetration of coolant from said wells into excavations and reducing the heat release into those excavations due to heat conductivity, which results in the preservation of an adequate atmosphere in the mine and in the reduction of ventilation costs.

In addition, when used for sealing the annular space of upward development wells, the herein disclosed plugging fluid does not wash out during the recovery of oil from said wells thanks to its high density and adequate viscosity.

This provides for reliable sealing and heat insulation of the annular space of upward development wells, as well as precludes the possibility of the release of large amounts of heat into excavations and the violation of the temperature and gas conditions of the atmosphere in the mine.

Besides that, the plugging fluid of the invention is non-toxic and safe for the servicing personnel.

The plugging fluid according to the present invention can be prepared by a method known to those skilled in the art, which comprises the following steps.

1. A hydrocarbon liquid required for the fluid is prepared by distilling light fractions off highly viscous crude oil if such are present until an oil product is obtained having a temperature of the onset of boiling of 200°–220° C.

2. Titanium dioxide required for the fluid is prepared by finely crushing the starting titanium dioxide of any quality to a particle size of no more than 0.1 or 0.5μ.

3. After preparation, the initial components are weighed to provide the desired ratio and thoroughly mixed to form a homogeneous suspension.

The present invention will be better understood upon considering the following specific examples.

EXAMPLE 1

240 Grams of crude oil having a viscosity of 52.0·10$^6$ m$^2$/s at 20° C. and a density of 905 kg/m$^3$, and 60 g of pigmentary titanium dioxide (at 20% of the solid phase) were used for preparing the fluid. Oil and pigmentary titanium dioxide were thoroughly stirred for 10 minutes with heating up to 70° C.

The resulting suspension had a viscosity of 56.4·10$^6$ m$^2$/s at 20° C. and a density of 1,075 kg/m$^3$.

EXAMPLE 2

180 Grams of crude oil having a viscosity of 52.0·10$^6$ m$^2$/s at 20° C. and a density of 905 kg/m$^3$, and 120 g of pigmentary titanium dioxide (at 40% of the solid phase) were used for preparing the fluid, oil and pigmentary titanium dioxide were thoroughly stirred for 10 minutes with heating up to 70° C.

The resulting suspension had a viscosity of 70.0·10$^6$ m$^2$/s at 20° C. and a density of 1,332 kg/m$^3$.

Samples of the plugging fluid prepared in accordance with the procedure of Examples 1 and 2 were placed in beakers which were then filled with model stratal water having a density of 1,050 kg/m$^3$ and kept for a year. No organic phase came to the surface during this period.

In analogous control samples of suspensions of baryta flour, bentonite, chemically deposited calcium carbonate, Portland cement and other mineral powders, lamination and supernatant organic phase were observed after only 1 to 4 days.

The plugging fluid according to the invention can be used most advantageously for sealing the annular space in upward holes through which coolant is supplied at high temperature via lifting pipes to the oil bed when utilizing the method of thermal recovery of oil.

The herein disclosed plugging fluid helps reduce the conductive heating of the oil bed near the wellhead and preclude the penetration of coolant through cracks in the oil bed near the wellhead directly into excavations. This makes for improved sanitary conditions of labor in the mine at minimum ventilation costs, as well as for a reduced consumption of coolant for oil recovery purposes.

In addition, the plugging fluid of the invention is liquid and, therefore, can be readily removed, if desired, for example, upon transition from the injection of coolant to the removal of liquid from the hole via the annular space, when eliminating the sanding up by way of flushing the hole via the annular space, or when simultaneously injecting into the hole via the annular space a coolant or some other agent (such as gas, water, and the like).

What is claimed is:

1. A plugging fluid on the basis of a hydrocarbon liquid having the characteristics of highly viscous crude oil and a weighting material, where said weighting material is titanium dioxide having a particle size of up to 0.5μ, the aforesaid components being taken in the following amounts in percent by weight:
hydrocarbon liquid: 60 to 80
titanium dioxide: 20 to 40.

2. Plugging fluid of claim 1, wherein the particle size of said titanium dioxide is up to 0.1μ.

3. Plugging fluid of claim 1, wherein said hydrocarbon liquid starts to boil at a temperature of 200°–220° C.

4. Plugging fluid of claim 2, wherein said hydrocarbon liquid starts to boil at a temperature of 200°–220° C.

5. Plugging fluid according to claim 2 wherein said hydrocarbon liquid is obtained by distilling off of light fractions from highly viscous crude oil.

6. Hydrocarbon fluid according to claim 4 wherein said hydrocarbon liquid is obtained by distilling off of light fractions from highly viscous crude oil.

* * * * *